(12) United States Patent
Feller

(10) Patent No.: US 7,961,415 B1
(45) Date of Patent: Jun. 14, 2011

(54) MASTER CALIBRATION CHANNEL FOR A MULTICHANNEL TAPE DRIVE

(75) Inventor: Marc Feller, Long Beach, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 12/695,293

(22) Filed: Jan. 28, 2010

(51) Int. Cl.
*G11B 5/09* (2006.01)
(52) U.S. Cl. ........................................................ 360/39
(58) Field of Classification Search .................... 360/39, 360/53; 381/66, 92, 94.7; 704/205, 219, 704/227; 379/28, 406.08; 708/322
See application file for complete search history.

(56) References Cited

U.S. PATENT DOCUMENTS

| | | | | |
|---|---|---|---|---|
| 4,956,838 A | * | 9/1990 | Gilloire et al. ................. | 370/291 |
| 5,491,487 A | * | 2/1996 | Gerlach ......................... | 342/378 |
| 5,555,285 A | * | 9/1996 | Tapia et al. ..................... | 379/28 |
| 6,178,248 B1 | * | 1/2001 | Marash .......................... | 381/94.7 |
| 6,332,028 B1 | * | 12/2001 | Marash .......................... | 381/92 |
| 6,556,682 B1 | * | 4/2003 | Gilloire et al. ................. | 381/66 |
| 6,909,782 B2 | * | 6/2005 | Bershad et al. .......... | 379/406.08 |
| 7,167,884 B2 | * | 1/2007 | Picciolo et al. ............... | 708/322 |
| 7,426,464 B2 | * | 9/2008 | Hui et al. ....................... | 704/227 |
| 7,783,478 B2 | * | 8/2010 | Goldin .......................... | 704/205 |
| 2010/0010811 A1 | * | 1/2010 | Zhou et al. .................... | 704/219 |
| 2010/0053444 A1 | * | 3/2010 | Chen ............................. | 348/607 |

* cited by examiner

*Primary Examiner* — Fred Tzeng
(74) *Attorney, Agent, or Firm* — Baker Botts L.L.P.

(57) ABSTRACT

In one embodiment, an apparatus comprises two or more slave channels, wherein each one of the slave channels comprises a non-adaptive filter operable to filter an input signal to the slave channel using filter coefficients received from a master channel; and the master channel coupled to each one of the slave channels, wherein the master channel comprises an adaptive filter operable to: for each one of one or more of the slave channels, determine the filter coefficients for the slave channel using the input signal to the slave channel; and send the filter coefficients to the slave channel.

19 Claims, 5 Drawing Sheets

MASTER CALIBRATION CHANNEL FOR A MULTICHANNEL TAPE DRIVE

TECHNICAL FIELD

The present disclosure generally relates to adaptation filtering in multichannel systems and more specifically relates to a master channel determining adaptive filter coefficients for multiple slave channels in a multichannel system.

BACKGROUND

An adaptive filter is a filter that self-adjusts its transfer function according to an optimizing algorithm. Most adaptive filters are digital filters that perform digital signal processing and adapt their performance based on the input signals. An adaptive filter has adaptive filter coefficients. Adaptive filters are especially suitable to those applications where some parameters of the desired signal processing operation are not known in advance. Such applications commonly employ adaptive filters that use feedback to refine the values of their adaptive filter coefficients and hence their frequency responses. In general, the adapting process involves the use of a cost function, which is a criterion for optimum performance of the adaptive filter, to feed an optimizing algorithm, which determines how to modify the adaptive filter coefficients to minimize the cost of the next iteration. In contrast, a non-adaptive filter has static filter coefficients. Adaptive filters are routinely used in devices such as mobile telephones, digital cameras, camcorders, medical monitoring equipments, or tape drives for various purposes such as noise cancellation, signal prediction, adaptive feedback cancellation, or echo cancellation.

A tape drive is a data storage device that reads and writes data stored on a magnetic tape. It is typically used for offline, archival data storage. A tape drive may be connected to a computer through Small Computer System Interface (SCSI), Fibre Channel, Serial Advanced Technology Attachment (SATA), Universal Serial Bus (USB), FireWire, Fibre Connectivity (FICON), or other interfaces. A multichannel tape drive is capable of reading data from and writing data to multiple tracks on a magnetic tape simultaneously, thus providing a higher data transfer rate typically characterized by high tape speed, high tape capacity, and small tape thickness. Adaptive filters are often used in multichannel tape drives, and more specifically, in the read/write channels of the multichannel tape drives.

SUMMARY

The present disclosure generally relates to adaptation filtering in multichannel systems, such as tape drives, and more specifically relates to a master channel determining adaptive filter coefficients for multiple slave channels in a multichannel system.

In particular embodiments, an apparatus comprises two or more slave channels and a master channel. Each one of the slave channels comprises a non-adaptive filter operable to filter an input signal to the slave channel using filter coefficients received from the master channel. The master channel is coupled to each one of the slave channels and comprises an adaptive filter operable to: for each one of one or more of the slave channels, determine the filter coefficients for the slave channel using the input signal to the slave channel; and send the filter coefficients to the slave channel.

These and other features, aspects, and advantages of the disclosure are described in more detail below in the detailed description and in conjunction with the following figures.

DETAILED DESCRIPTION

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
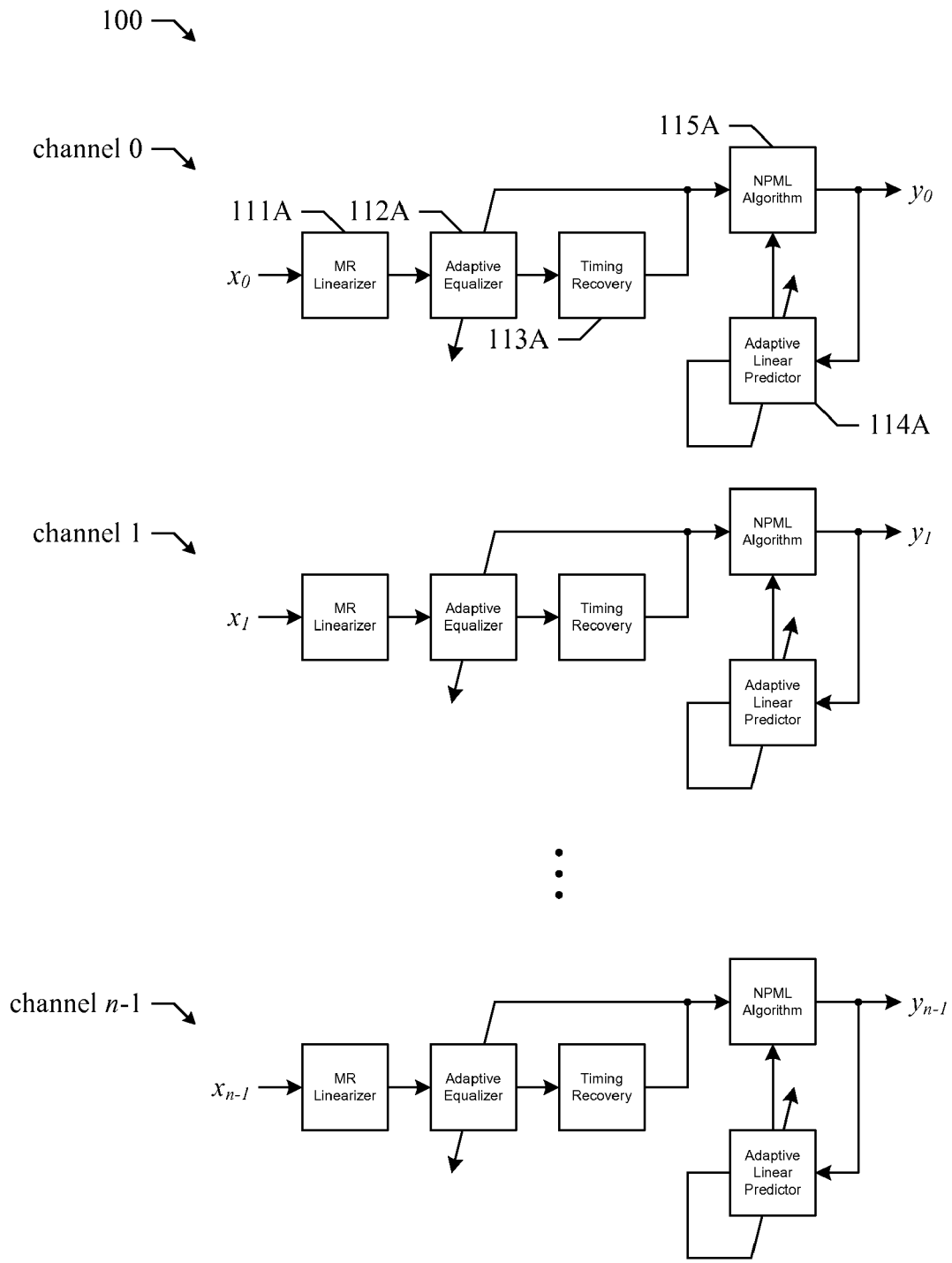
FIG. 1 (prior art) illustrates an example of a multichannel tape drive where each channel has an adaptive filter.

An adaptive filter is a filter that self-adjusts its transfer function according to an optimizing algorithm. An adaptive filter has adaptive filter coefficients. In contrast, a non-adaptive filter has static filter coefficients, which collectively form the transfer function. Adaptive filters may be used in many types of devices, one of which is multichannel tape drives. FIG. 1 illustrates an example of a multichannel tape drive 100. In this example, there are n independent channels, denoted as channels 0 to n−1, where n≧2. More specifically, channels 0 to n−1 may be n independent serial read channels employed in multichannel tape drive 100. Although many architectural variations are possible, each channel may include a number of components. Using channel 0 as an example, the input signal to channel 0, denoted as $x_0$, may be a digital signal that is the result of selective processing (e.g., sampling, conditioning, or shaping) on the signal from the read head of multichannel tape drive 100. Channel 0 may include a head signal linearizer 111A, an adaptive equalizer 112A, a timing recovery module 113A, an adaptive linear predictor 114A, and a detector 115A. Each component may perform certain processing operations with respect to input signal $x_0$. The output signal from channel 0, denoted as $y_0$, is the result of the processing operations performed with respect to input signal $x_0$. Additional operations (e.g., detection) may be performed with respect to output signal $y_0$.

Some of the components illustrated for each channel in FIG. 1 may be optional. For example, the type of head signal linearizer 111A may vary depending on the type of head used in multichannel tape drive 100. In particular embodiments, head signal linearizer 111A may be a Magnetoresistive (MR) linearizer 111A. Magnetoresistivity is the property of a material to change the value of its electrical resistance when an external magnetic field is applied to it. If multichannel tape drive 100 has a MR head, input signal $x_0$ may have a curve that may be corrected by MR linearizer 111A, which adds harmonic correction to the curve. In particular embodiments, detector 115A may employ or implement Viterbi, Noise-Predictive Maximum Likelihood (NPML), BCJR (named after its inventors Bahl, Cocke, Jelinek, and Raviv), Low-Density Parity-Check (LDPC), or similar algorithms. In particular embodiments, channels 0 to n−1 each include an adaptive filter, which may include an adaptive equalizer (e.g., adaptive equalizer 112A) and an adaptive linear predictor (e.g., adaptive linear predictor 114A), and thus may be referred to as adaptive channels. In particular embodiments, adaptive channels 0 to n−1 each perform adaptive filtering on their respective input signals $x_0$ to $x_{n-1}$.

There are various implementations of the adaptive filters, including, for example, Least Mean Squares (LMS) filter and Recursive Least Squares (RLS) filter. The optimizing algorithm used in an adapting process may be very complex as it often requires a large number of multipliers and adders in order to carry out the specific adaptive algorithm that causes an adaptive filter (e.g., the adaptive filter of channel 0) to optimally equalize or predict the received signal (e.g., input signal $x_0$) by adjustment of the adaptive filter coefficients. These multipliers and adders increase the power dissipation around the area of the Application-Specific Integrated Circuit (ASIC) and may reduce the maximum attainable data transfer rate due to additional delays. Such problems are even more exacerbated in a multichannel tape drive (e.g., multichannel tape drive 100) where there are many independent adaptive channels (e.g., channels 0 to n−1), each having its own adaptive filter independently performing its own adapting process (e.g., determining adaptive filter coefficients).

Particular embodiments may incorporate an additional master channel in a multichannel tape drive, which includes an adaptive filter, and remove and replace the adaptive filters from the existing channels of the multichannel tape drive with non-adaptive filters. In particular embodiments, the existing channels become the slave channels to the master channel and are non-adaptive (i.e., the slave channels each having a non-adaptive filter). The master channel is responsible for determining the filter coefficients for each of the slave channels independently. Each of the slave channels, instead of determining its own filter coefficients, uses the filter coefficients determined for it by the master channel with its non-adaptive filter.

Figure 2:
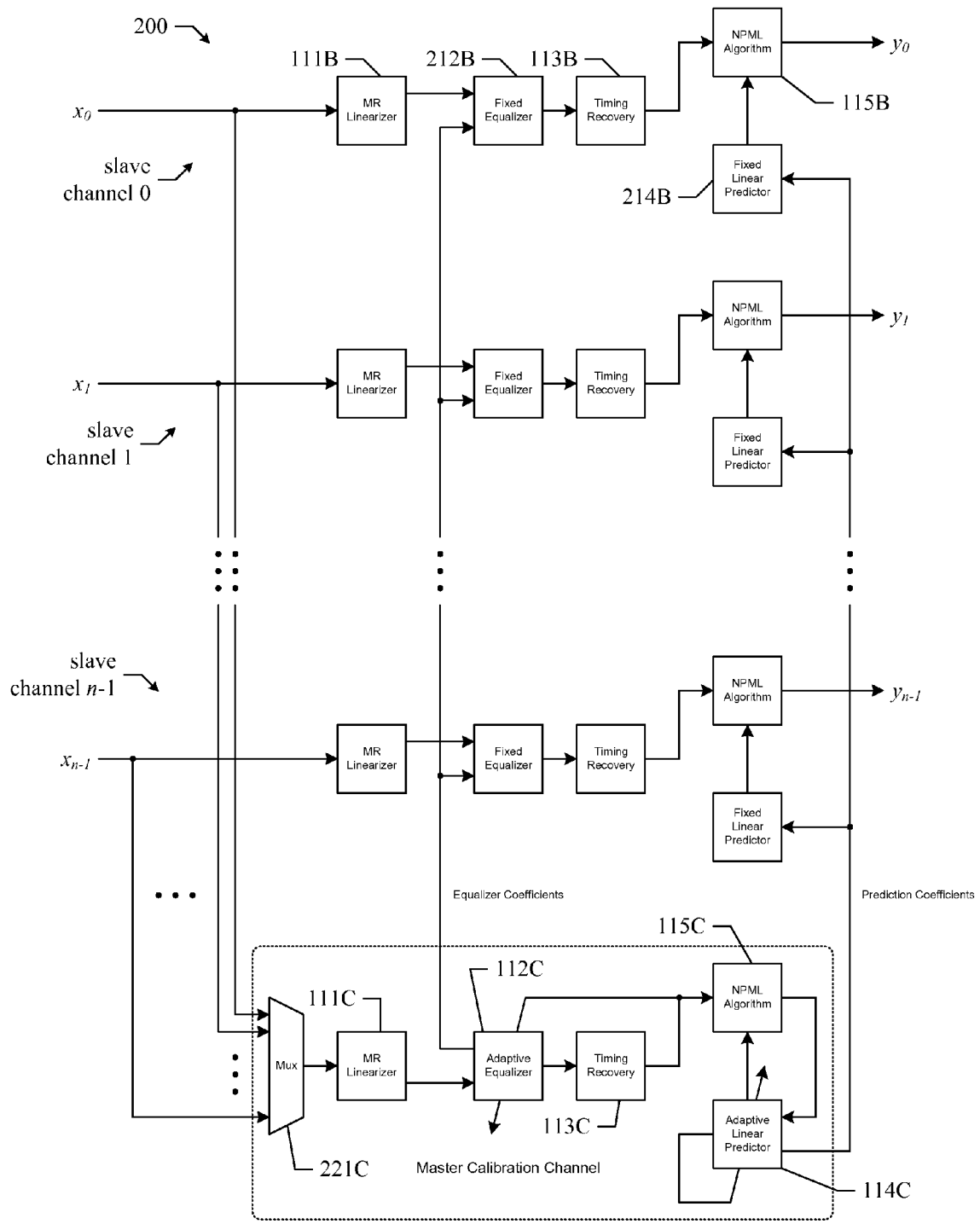
FIG. 2 illustrates an example of a multichannel tape drive having a master channel and multiple slave channels according to a first embodiment of the present disclosure.

FIG. 2 illustrates an example of a multichannel tape drive 200 having a master channel and multiple slave channels according to a first embodiment of the present disclosure. In this embodiment, there are n independent slave channels, denoted as slave channels 0 to n−1, where n≧2. More specifically, slave channels 0 to n−1 may be n independent serial read channels employed in multichannel tape drive 200. Although many architectural variations are possible, each slave channel may include a number of components, and some of the components illustrated for each slave channel in FIG. 2 may be optional. Using slave channel 0 as an example, in particular embodiments, the input signal to slave channel 0, denoted as $x_0$, may be a digital signal that is the result of selective processing (e.g., sampling, conditioning, or shaping) on the signal from the read head of multichannel tape drive 200. In particular embodiment, slave channel 0 may include a head signal linearizer 111B, a fixed equalizer 212B, a timing recovery module 113B, a fixed linear predictor 214B, and a detector 115B. In particular embodiments, each component may perform certain processing operations with respect to input signal $x_0$. In particular embodiments, the output signal from slave channel 0, denoted as $y_0$, is the result of the processing operations performed with respect to input signal $x_0$. Additional operations (e.g., detection) may be performed with respect to output signal $y_0$.

Note that the slave channels illustrated in FIG. 2 are somewhat similar as the channels illustrated in FIG. 1, but with a few important differences. Using slave channel 0 illustrated in FIG. 2 and channel 0 illustrated in FIG. 1 as an example for comparison, first, the similarities may include: head signal linearizer 111B is similar as head signal linearizer 111A; timing recovery module 113B is similar as timing recovery module 113A; and detector 115B is similar as detector 115A. However, instead of having an adaptive equalizer (e.g., adaptive equalizer 112A) and an adaptive linear predictor (e.g., adaptive linear predictor 114A), in particular embodiments, slave channel 0 illustrated in FIG. 2 has fixed equalizer 212B and fixed linear predictor 214B. In particular embodiments, slave channel 0 has a non-adaptive filter that includes fixed equalizer 212B and fixed linear predictor 214B. Slave channels 1 to n−1 similarly each have a non-adaptive filter that includes a fixed equalizer and a fixed linear predictor. Thus, in particular embodiments, slave channels 0 to n−1 are non-adaptive channels.

Although many architectural variations are possible, the master channel may include a number of components, and some of the components illustrated for the master channel in FIG. 2 may be optional. In particular embodiments, the master channel may include a multiplexer 221C (also referred to as a mux), a head signal linearizer 111C, an adaptive equalizer 112C, a timing recovery module 113C, an adaptive linear predictor 114C, and a detector 115C. In particular embodiments, some of the components of the master channel illustrated in FIG. 2 are similar to those of the channels illustrated in FIG. 1. For example, head signal linearizer 111C is similar as head signal linearizer 111A; adaptive equalizer 112C is similar as adaptive equalizer 112A; timing recovery module 113C is similar as timing recovery module 113A; adaptive linear predictor 114C is similar as adaptive linear predictor 114A; and detector 115C is similar as detector 115A. In particular embodiments, the master channel includes an adaptive filter that includes adaptive equalizer 112C and adaptive linear predictor 114C, and thus the master channel is an adaptive channel.

A multiplexer is a device that selects one of many analog or digital input signals and forwards the selected input signal onto a single line. The selection process may be referred to as multiplexing. In particular embodiments, input signals $x_0$ to $x_{n-1}$ to non-adaptive slave channels 0 to n−1 are also fed into multiplexer 221C of the adaptive master channel in addition to the respective slave channels. In particular embodiments, multiplexer 221C selects one of input signals $x_0$ to $x_{n-1}$ at a time and forwards the selected input signal to head signal linearizer 111C. In particular embodiments, the master channel, through its adaptive filter, determines the filter coefficients (i.e., performing the adaptation) for each of slave channels 0 to n−1 independently and one at a time using the particular input signal selected by multiplexer 221C. Thus, the master channel may be referred to as the master calibration channel (MCC). In particular embodiments, upon completion of an adaptation for a particular slave channel, the filter coefficients determined by the master channel for the particular slave channel are sent to that slave channel. The corresponding slave channel may use the filter coefficients with its non-adaptive filter to process its input signal, while the master channel performs adaptations for the other slave channels (i.e., determining filter coefficients for the other slave channels). In particular embodiments, the master channel may repeatedly and continuously perform adaptation for each of the slave channels in turn and one at a time. In particular embodiments, when the last slave channel (e.g., slave channel $x_{n-1}$) has been reached, the master channel may start again with the first slave channel (e.g., slave channel $x_0$).

Figure 5:
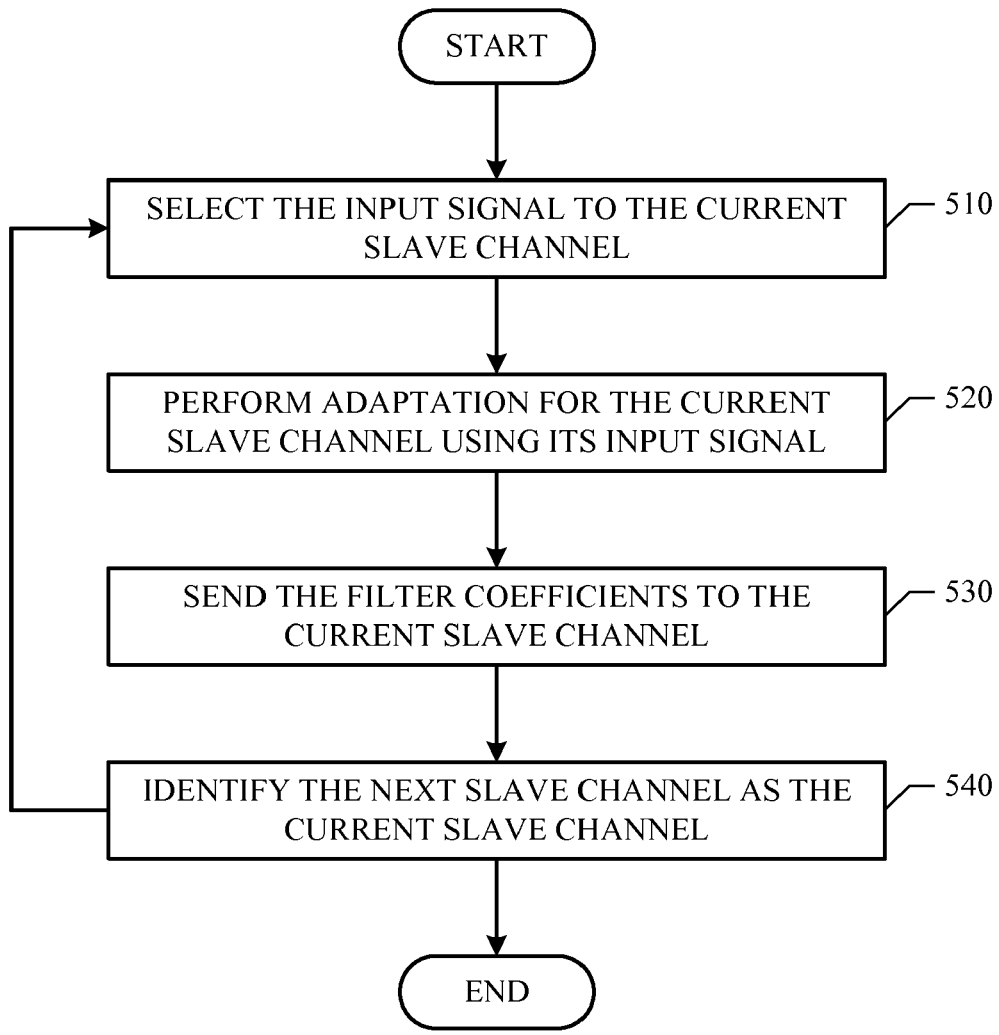
FIG. 5 illustrates an example of adaptations performed by a master channel for multiple slave channels.

To describe adaptations performed by the master channel for slave channels 0 to n–1 in more detail, FIG. 5 illustrates example steps performed by the master channel. In particular embodiments, the master channel performs adaptation independently for one slave channel at a time. For clarification purpose, the slave channel for which the master channel currently performs the adaptation is referred to as the current slave channel. In particular embodiments, multiplexer 221C selects the input signal to the current slave channel and forwards the selected input signal to head signal linearizer 111C (step 510). For example, suppose the current slave channel is slave channel 0. Thus, multiplexer 221C selects input signal $x_0$ and forwards input signal $x_0$ to head signal linearizer 11C. The master channel performs adaptation for the current slave channel (step 520), which is slave channel 0 at the moment. In particular embodiments, during the adapting process, head signal linearizer 111C, adaptive equalizer 112C, timing recovery module 113C, adaptive linear predictor 114C, and detector 115C may each perform operations with respect to input signal $x_0$ (i.e., the input signal to the current slave channel). In particular embodiments, adaptive equalizer 112C and adaptive linear predictor 114C may determine filter coefficients for slave channel 0 using input signal $x_0$. Upon completion of the adapting process, the master channel may send the filter coefficients to the current slave channel (step 530), which is slave channel 0 at the moment. Slave channel 0 may then incorporate the filter coefficients determined by the master channel in its non-adaptive filter (i.e., fixed equalizer 212B and fixed linear predictor 214B) to perform filtering process on its input signal (i.e., $x_0$).

The master channel may then identifies the next slave channel (e.g., slave channel 1) as the current slave channel (step 540) and repeat steps 510-530 for slave channel 1. Specifically, multiplexer 221C may select input signal $x_1$, and adaptive equalizer 112C and adaptive linear predictor 114C may determine the filter coefficients for slave channel 1 and send the filter coefficients to slave channel 1. Upon receiving the filter coefficients, slave channel 1 may incorporate the filter coefficients in its non-adaptive filter to perform filtering process on its input signal (i.e., $x_1$).

Meanwhile, the master channel may move on to performing adaptations (i.e., determining filter coefficients) for slave channel 2, slave channel 3, and so on, until the master channel reaches slave channel n–1, which is the last slave channel. In particular embodiments, once adaptation has been performed for slave channel n–1 and the filter coefficients determined using input signal $x_{n-1}$ have been sent to slave channel n–1, the master channel may return to slave channel 0 and perform another adaptation for slave channel 0 again. That is, the master channel may determine the filter coefficients again for slave channel 0 using the current input signal to slave channel 0. At this moment, slave channel 0 becomes the current slave channel once more. Note that while the master channel is performing adaptations for slave channels 1 to n–1, slave channel 0 uses the filter coefficients determined for it previously with its non-adaptive filter to filter its input signal. However, the new filter coefficients determined by the master channel may be sent to slave channel 0. Slave channel 0 may then update the filter coefficients of its non-adaptive filter using the newly determined filter coefficients received from the master channel. Subsequent filtering of the input signal to slave channel 0 then uses the newly determined filter coefficients. The master channel may then move on to performing adaptations for slave channels 2 to n–1 one at a time, as before, and repeat the cycle again. The process may continue for any period of time.

Figure 3:
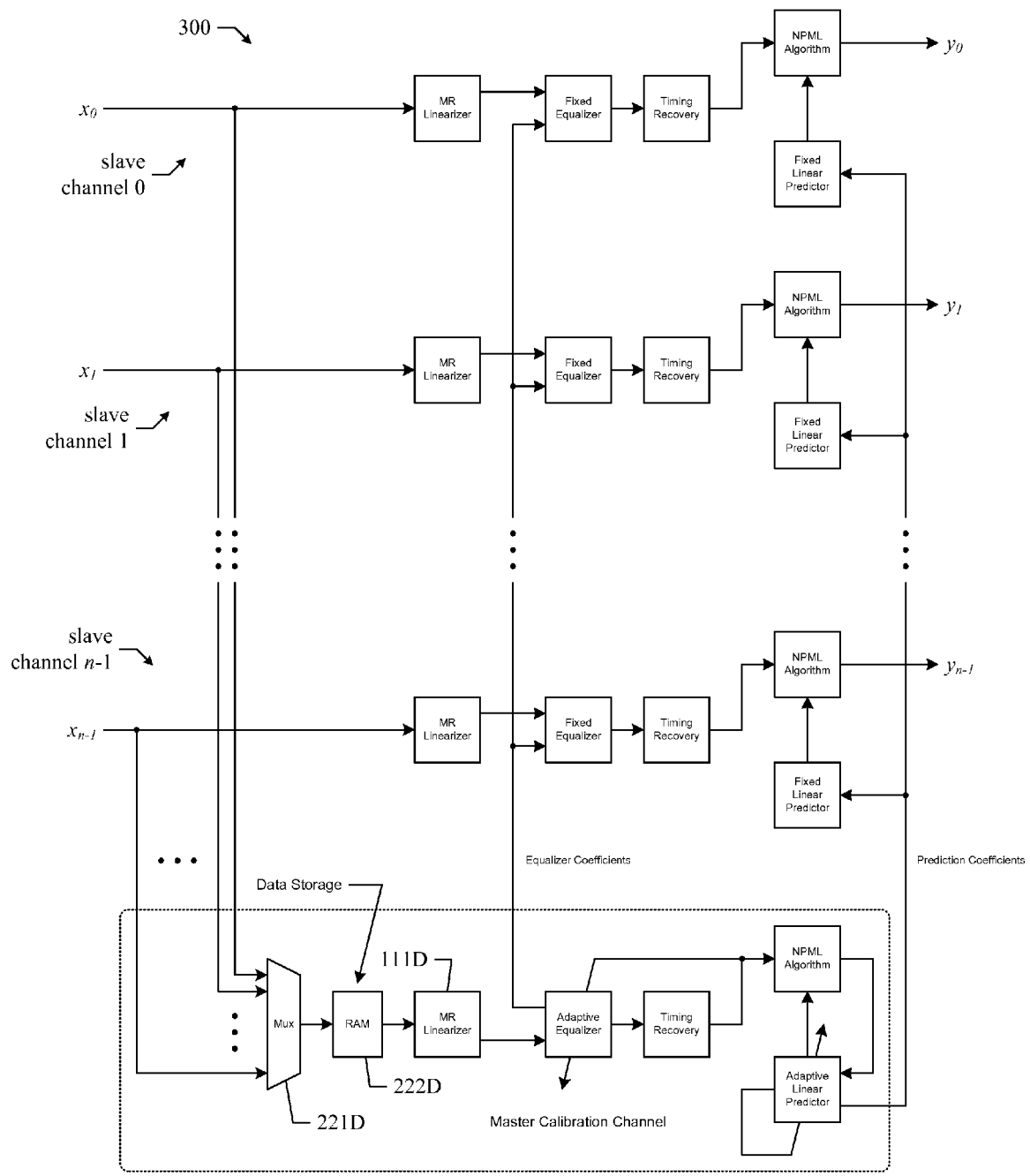
FIG. 3 illustrates an example of a multichannel tape drive having a master channel and multiple slave channels according to a second embodiment of the present disclosure.

The embodiment illustrated in FIG. 2 is more suitable where input signals to the slave channels are sent to the master channel in real time. FIG. 3 illustrates an example of a multichannel tape drive 300 having a master channel and multiple slave channels according to a second, alternative embodiment of the present disclosure. Multichannel tape drive 300 is similar as multichannel tape drive 200 with one exception: the master channel additionally includes a data storage 222D. In particular embodiments, data storage 222D may be Random Access Memory (RAM). In particular embodiments, data storage 222D may be situated between a multiplexer 221D and a head signal linearizer 111D.

In particular embodiments, input signals $x_0$ to $x_{n-1}$ to slave channels 0 to n–1 may first be stored in data storage 222D. Sometimes, with a multichannel tape drive, a number of factors may cause the input signals to the serial read channels to be corrupted or faulty. In particular embodiments, the input signals received at the master channel may first be stored in data storage 222D so that they may be examined. If an input signal is faulty, then it is discarded and no adaptation is performed using the faulty signal for the corresponding slave channel. In particular embodiments, only correct input signals are forwarded to the adaptive filter of the master channel. The master channel thus only performs adaptations (i.e., determining the filter coefficients) using the correct input signals for the corresponding slave channels.

Adaptation may be time consuming due to the large number of multiplications and additions. Thus, the master channel, which performs the adaptations for the slave channels, may not be able to process the input signals as fast as the slave channels or as fast as the input signals are received. In particular embodiments, the input signals received at the master channel may first be stored in data storage 222D so that they may be sent to the adaptive filter of the master channel at a rate slower than the rate they are received at the master channel. The adaptive filter thus has sufficient time to perform adaptation for each of slave channels 0 to n–1.

Although FIG. 2 only illustrates one master channel, in particular embodiments, a multichannel tape drive may include multiple adaptive master channels, with each adaptive master channel supporting (i.e., performing adaptation for) a number of non-adaptive slave channels in the same manner as described above in connection with FIGS. 2 and 5. In addition, the embodiment illustrated in FIG. 3, while satisfactory for many implementations, may introduce data loss if the master channel needs to process data more slowly than the slave channels.

Figure 4:
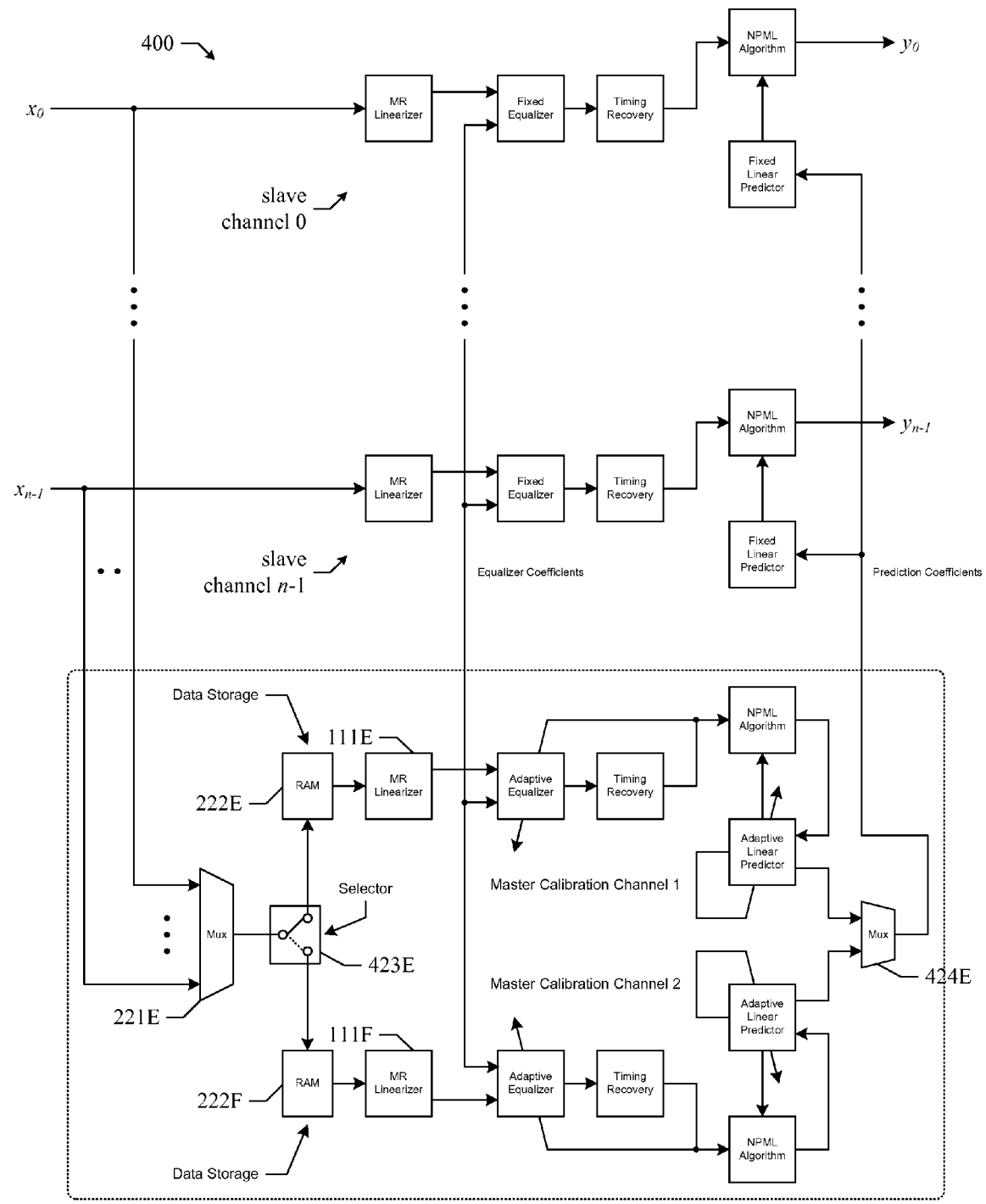
FIG. 4 illustrates an example of a multichannel tape drive having two master channels and multiple slave channels according to a third embodiment of the present disclosure.

FIG. 4 illustrates an example of a multichannel tape drive 400 having two, or in general multiple, master channels and multiple slave channels according to a third, alternative embodiment of the present disclosure. Multichannel tape drive 400 is similar as multichannel tape drive 300 with one exception: it includes more than one master channel (e.g., master calibration channel 1 and master calibration channel 2), each master channel additionally includes data storage units 222E and 222F. In particular embodiments, data storage units 222E and 222F may be Random Access Memory (RAM). In particular embodiments, data storage units 222E and 222F may be situated between a multiplexer 221E and a head signal linearizer 111E or 111F. In particular embodiments, input signals $x_0$ to $x_{n-1}$ to slave channels 0 to n−1 may first be stored in data storage 222E as directed by a selector 423E. Input signals $x_0$ to $x_{n-1}$ to slave channels 0 to n−1 may then be stored in data storage 222F as directed by selector 423E, while the stored information in data storage 222E is processed by one master channel. After data storage 222F is filled, input signals $x_0$ to $x_{n-1}$ to slave channels 0 to n−1 may again be stored in data storage 222E as directed by selector 423E, while the stored information in data storage 222F is processed by another master channel, the procedure continuing in alternation. The output to the slave channels 0 to n−1 is selected by multiplexer 424E so as to deliver the most recently processed data. In this manner each master channel may process data at the rate of the individual slave channels without introducing data loss. More specifically, in particular embodiments, the stored data may be removed from data storage units 222E and 222F by each master channel continuously, but at a rate slower than the rate that data are stored (i.e., written) into data storage units 222E and 222F. For example, the stored data may be removed from data storage units 222E and 222F by each master channel at a rate that is approximately half of the rate that are stored into data storage units 222E and 222F.

In practice, the present disclosure may require that the master channel introduces less complexity than it relieves (i.e., by removing the adaptive filters from the individual slave channels). Therefore, in particular embodiments, the number of slave channels, n, served by a master channel may have a minimum value for each design. The minimum value may depend on the number and size of the adaptive filters in the individual channels and may be determined by analysis. In particular embodiments, if the adaptive portions of the filters in each channel are known to occupy a fraction, 1/k, of the total channel area, then it may be shown that complexity is reduced whenever n>k. Similarly in the case of m multiple master channels complexity is reduced whenever n>mk.

The components included in a master channel or a slave channel (e.g., adaptive filter, non-adaptive filter, or timing recovery module) may be implemented as software, firmware, hardware, or a combination thereof. For example, the adaptive equalizer and the adaptive linear predictor included in the master channel, the fixed equalizer and the fixed linear predictor included in each slave channel, and the timing recovery module included in the master channel and each slave channel may each be implemented as Integrated Circuits (ICs) using suitable designs such as, for example, Field-Programmable Gate Array (FPGA), Application-Specific Instruction-Set Processor (ASIP), ASIC, or Complex Programmable Logic Device (CPLD). Functional logic may be embedded in such ICs so that each component may perform the necessary operations (e.g., the adaptive filter of the master channel may be programmed to determine the filter coefficients for the slave channels, and the non-adaptive filter of each slave channel may be programmed to filter the input signal to the slave channel using the predetermined filter coefficients).

Although the present disclosure has been described in connection with multichannel tape drives, the concept may be applied to any type of multichannel systems. In addition, the master channel and the slave channels illustrated in FIGS. 2, 3, and 4 may include different components in different implementations. For example, the master channel and each of the slave channels may or may not include a head signal linearizer. It will be appreciated that, for clarification purposes, the above description describe particular embodiments with reference to different functional units and processors. However, it will be apparent that any suitable distribution of functionality between different functional units, processors, or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization. Additionally, although a feature may appear to be described in connection with particular embodiments, one skilled in the art would recognize that various features of the described embodiments may be combined in accordance with the invention.

Furthermore, although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. An apparatus comprising:
   two or more slave channels, wherein each one of the slave channels comprises a non-adaptive filter operable to filter an input signal to the slave channel using filter coefficients received from a master channel; and
   the master channel coupled to each one of the slave channels, wherein the master channel comprises an adaptive filter operable to:
   for each one of one or more of the slave channels,
      determine the filter coefficients for the slave channel using the input signal to the slave channel; and
      send the filter coefficients to the slave channel.

2. The apparatus recited in claim 1, wherein:
   the non-adaptive filter of each one of the slave channels comprises a fixed equalizer and a fixed linear predictor; and
   the adaptive filter of the master channel comprises an adaptive equalizer and an adaptive linear predictor.

3. The apparatus recited in claim 1, wherein:
   the apparatus is a multichannel tape drive; and
   the slave channels are serial read channels of the multichannel tape drive.

4. The apparatus recited in claim 1, wherein the master channel further comprises a multiplexer coupled to the adaptive filter and operable to:
   receive two or more input signals to the slave channels;
   select one of the input signals; and forward the selected one of the input signals to the adaptive filter.

5. The apparatus recited in claim 1, wherein the master channel further comprises:
a multiplexer coupled to a memory and operable to:
receive two or more input signals to the slave channels;
select one of the input signals; and
forward the selected one of the input signals to the memory; and
the memory coupled to the multiplexer and the adaptive filter and operable to store the selected one of the input signals to be forwarded to the adaptive filter.

6. The apparatus recited in claim 5, wherein the selected one of the input signals is forwarded to the adaptive filter at a first rate slower than a second rate at which the input signals are received at the multiplexer.

7. The apparatus recited in claim 1,
wherein the master channel further comprises a first memory coupled to the adaptive filter and operable to store one or more input signals to the slave channels to be forwarded to the adaptive filter;
the apparatus further comprising:
a second master channel coupled to each one of the slave channels, wherein the second master channel comprises:
a second adaptive filter operable to:
for each one of one or more of the slave channels,
determine the filter coefficients for the slave channel
using the input signal to the slave channel; and
send the filter coefficients to the slave channel; and
a second memory coupled to the second adaptive filter and operable to store the input signals to the slave channels to be forwarded to the second adaptive filter; and
a multiplexer coupled to the first memory and the second memory and operable to:
receive two or more input signals to the slave channels;
select one of the input signals; and
forward the selected one of the input signals to either the first memory or the second memory in alternation.

8. The apparatus recited in claim 7,
wherein the master channel is operable to produce one or more first output signals comprising filter coefficients for one or more of the slave channels, and the second master channel is operable to produce one or more second output signals comprising filter coefficients for one or more of the slave channels;
the apparatus further comprising a multiplexer coupled to the master channel and the second master channel and operable to:
receive the first output signals from the master channel and the second output signals from the second master channel;
select one of the first output signals or the second output signals; and
forward the filter coefficients of the selected one of the output signals to one of the slave channels in alternation.

9. An apparatus comprising:
two or more slave channels, wherein each one of the slave channels comprises a non-adaptive filter operable to filter an input signal to the slave channel using filter coefficients received from a first master channel or a second master channel; and
the first master channel coupled to each one of the slave channels, wherein the first master channel comprises:
a first adaptive filter operable to:
for each one of one or more of the slave channels,
determine the filter coefficients for the slave channel using the input signal to the slave channel; and
send the filter coefficients to the slave channel; and
a first memory coupled to the first adaptive filter and operable to store one or more input signals to the slave channels to be forwarded to the first adaptive filter; and
the second master channel coupled to each one of the slave channels, wherein the second master channel comprises:
a second adaptive filter operable to:
for each one of one or more of the slave channels,
determine the filter coefficients for the slave channel using the input signal to the slave channel; and
send the filter coefficients to the slave channel; and
a second memory coupled to the second adaptive filter and operable to store one or more input signals to the slave channels to be forwarded to the second adaptive filter.

10. The apparatus recited in claim, 9, further comprising a first multiplexer coupled to the first memory of the first master channel and the second memory of the second master channel and operable to:
receive two or more input signals to the slave channels;
select one of the input signals; and
forward the selected one of the input signals to either the first memory or the second memory in alternation.

11. The apparatus recited in claim 9, wherein:
the first adaptive filter of the first master channel comprises a first adaptive equalizer and a first adaptive linear predictor; and
the second adaptive filter of the second master channel comprises a second adaptive equalizer and a second adaptive linear predictor.

12. The apparatus recited in claim 11, further comprising a second multiplexer coupled to the first adaptive linear predictor and the second adaptive linear predictor and operable to:
receive one or more first output signals from the first master channel and one or more second output signals from the second master channel, wherein the first output signals comprise filter coefficients for one or more of the slave channels, and the second output signals comprise filter coefficients for one or more of the slave channels;
select one of the first output signals or the second output signals; and
forward the filter coefficients of the selected one of the output signals to one of the slave channels in alternation.

13. A method comprising:
for each one of two or more slave channels that each comprise a non-adaptive filter:
determining, by a master channel that comprises an adaptive-filter, filter coefficients for the slave channel using an input signal to the slave channel;
sending, by the master channel, the filter coefficients to the slave channel;
receiving, at the slave channel, the filter coefficients from the master channel; and
filtering, by the slave channel, the input signal to the slave channel using the filter coefficients received from the master channel.

14. The method recited in claim 13, further comprising for each one of the salve channels, incorporating the filter coefficients received from the master channel in its non-adaptive filter.

15. The method recited in claim 13,
wherein the master channel further comprises a multiplexer coupled to the adaptive filter;
the method further comprising:
- receiving, at the multiplexer, two or more input signals to the slave channels;
- selecting, by the multiplexer, one of the input signals; and
- forwarding, by the multiplexer, the selected one of the input signals to the adaptive filter.

16. The method recited in claim 13,
wherein the master channel further comprises a multiplexer and a memory coupled to each other;
the method further comprising:
- receiving, at the multiplexer, two or more input signals to the slave channels;
- selecting, by the multiplexer, one of the input signals; and
- forwarding, by the multiplexer the selected one of the input signals to the memory; and
- storing, in the memory, the selected one of the input signals to be forwarded to the adaptive filter.

17. The method recited in claim 16, wherein the selected one of the input signals is forwarded to the adaptive filter at a first rate slower than a second rate at which the input signals are received at the multiplexer.

18. The method recited in claim 13,
wherein the master channel further comprises a first memory coupled to the adaptive filter;
the method further comprising:
- receiving, at a multiplexer coupled to the master channel and a second master channel that comprises a second adaptive filter and a second memory coupled to each other, two or more input signals to the slave channels;
- selecting, by the multiplexer, one of the input signals; and
- forwarding, by the multiplexer, the selected one of the input signals to either the first memory or the second memory in alternation.

19. The method recited in claim 18, further comprising:
receiving, at a second multiplexer coupled to the master channel and the second master channel, one or more first output signals from the master channel and one or more second output signals from the second master channel, wherein the first output signals comprise filter coefficients for one or more of the slave channels, and the second output signals comprise filter coefficients for one or more of the slave channels;
selecting, by the second multiplexer, one of the first output signals or the second output signals; and
forwarding, by the second multiplexer, the filter coefficients of the selected one of the output signals to one of the slave channels in alternation.

* * * * *